(12) United States Patent
Matsumura et al.

(10) Patent No.: US 9,979,047 B2
(45) Date of Patent: May 22, 2018

(54) ALL-SOLID BATTERY

(71) Applicant: MURATA MANUFACTURING CO., LTD., Nagaokakyo-Shi, Kyoto-fu (JP)

(72) Inventors: Tadaaki Matsumura, Nagaokakyo (JP); Mika Tagami, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 519 days.

(21) Appl. No.: 14/580,687

(22) Filed: Dec. 23, 2014

(65) Prior Publication Data

US 2015/0111111 A1   Apr. 23, 2015

Related U.S. Application Data

(63) Continuation of application No. PCT/JP2013/066908, filed on Jun. 20, 2013.

(30) Foreign Application Priority Data

Jun. 28, 2012   (JP) ................................ 2012-145557

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/133* (2013.01); *H01M 4/136* (2013.01); *H01M 4/1393* (2013.01); *H01M 4/5815* (2013.01); *H01M 10/0525* (2013.01); *H01M 4/587* (2013.01); *H01M 2004/021* (2013.01); *H01M 2004/027* (2013.01); *H01M 2004/028* (2013.01); *H01M 2220/20* (2013.01);
(Continued)

(58) Field of Classification Search
None
See application file for complete search history.

(56) References Cited

U.S. PATENT DOCUMENTS

2010/0279176 A1   11/2010   Ogawa et al.
2011/0039162 A1   2/2011   Maeda
(Continued)

FOREIGN PATENT DOCUMENTS

JP   2003-068361 A   3/2003
JP   2008-171588 A   7/2008
(Continued)

OTHER PUBLICATIONS

PCT/JP2013/066908 Written Opinion dated Aug. 19, 2013.
PCT/JP2013/066908 ISR dated Aug. 19, 2013.

*Primary Examiner* — Daniel Gatewood
(74) *Attorney, Agent, or Firm* — Arent Fox LLP

(57) ABSTRACT

An all-solid battery that includes a positive electrode layer, a negative electrode layer, and a solid electrolyte layer interposed between the positive electrode layer and the negative electrode layer. At least one of the positive electrode layer and the negative electrode layer contains an electrode active material and a solid electrolyte, and a difference between a resistivity associated with ion migration and a resistivity associated with electron migration is 0 k$\Omega$·cm or more and 100 k$\Omega$·cm or less in the electrode layer containing the electrode active material and the solid electrolyte.

9 Claims, 1 Drawing Sheet

(51) Int. Cl.
 H01M 4/136 (2010.01)
 H01M 4/1393 (2010.01)
 H01M 4/133 (2010.01)
 H01M 4/587 (2010.01)
 H01M 4/58 (2010.01)
 H01M 4/02 (2006.01)

(52) U.S. Cl.
 CPC .............................. *H01M 2220/30* (2013.01);
   *H01M 2300/0068* (2013.01); *Y02E 60/122*
   (2013.01)

(56) References Cited

U.S. PATENT DOCUMENTS

| | | | |
|---|---|---|---|
| 2012/0021298 A1 | 1/2012 | Maeda | |
| 2012/0202033 A1* | 8/2012 | Chang | H01G 11/24 428/219 |
| 2012/0308870 A1* | 12/2012 | Okuda | H01M 4/133 429/126 |

FOREIGN PATENT DOCUMENTS

| | | | | |
|---|---|---|---|---|
| JP | 2008-226728 A | 9/2008 | | |
| JP | 2008-288098 A | 11/2008 | | |
| JP | 2010-272494 A | 12/2010 | | |
| JP | 2011-040281 A | 2/2011 | | |
| JP | 2011-204389 A | 10/2011 | | |
| JP | 2012-028231 A | 2/2012 | | |
| JP | 2012-094446 A | 5/2012 | | |
| WO | WO 2011102054 A1 * | 8/2011 | ............ | H01M 4/133 |

\* cited by examiner

ALL-SOLID BATTERY

CROSS REFERENCE TO RELATED APPLICATIONS

The present application is a continuation of International application No. PCT/JP2013/066908, filed Jun. 20, 2013, which claims priority to Japanese Patent Application No. 2012-145557, filed Jun. 28, 2012, the entire contents of each of which are incorporated herein by reference.

FIELD OF THE INVENTION

The present invention relates to an all-solid battery.

BACKGROUND OF THE INVENTION

In recent years, along with the development of portable electronic devices such as mobile phones and notebook computers, the demand for secondary batteries as built-in batteries of these electronic devices has been increasing. In particular, the development of lithium ion secondary batteries which have a high energy density and are capable of being charged/discharged has been extensively conducted.

Power consumption of portable electronic devices has been remarkably increasing as the number of their functions has been increased. For coping with the increase in power consumption, lithium ion secondary batteries having a large capacity have been required.

In the lithium ion secondary battery, in general, a metal oxide such as lithium cobaltate is used as a positive electrode active material, a carbon material such as graphite is used as a negative electrode active material, and a solution obtained by dissolving lithium hexafluorophosphate in an organic solvent, i.e. an organic solvent-based electrolytic solution is used as an electrolyte. In a battery having the above-mentioned configuration, an attempt has been made to increase internal energy by increasing the amount of an active material, and further, enhance the energy density, so that the output current is improved. It is also expected that the battery is increased in size and that the battery is mounted on a vehicle.

However, in a lithium ion secondary battery having the above-described configuration, an organic solvent used for the electrolyte is a combustible material, and therefore there is the risk that the battery may catch fire. For this reason, it is required that safety of the battery be further enhanced.

One of measures for enhancing safety of the lithium ion secondary battery is to use a solid electrolyte in place of an organic solvent-based electrolytic solution. As the solid electrolyte, use of organic materials such as polymers and gels and inorganic materials such as glass and ceramic is being studied. In particular, an all-solid secondary battery including as a solid electrolyte an inorganic material having incombustible glass or ceramic as a main component has been proposed, and is attracting attention.

For example, Japanese Patent Laid-open Publication No. 2003-68361 (hereinafter, referred to as Patent Document 1) describes a configuration of an all-solid lithium secondary battery including an incombustible solid electrolyte. In the all-solid lithium secondary battery, the solid electrolyte is a material which has a sulfide as a basic composition, and is composed of lithium sulfide and phosphorus sulfide, or a material which is composed principally of lithium sulfide and phosphorus sulfide, does not contain a transition metal element and does not contain silicon and germanium, a negative electrode active material is a carbon material, or a material with lithium ions inserted between carbon material layers, and a positive electrode active material is lithium cobaltate, lithium nickelate, lithium manganate or the like. Patent Document 1 describes that when graphite is used as a negative electrode active material, battery characteristics significantly vary depending on the type of the solid electrolyte, and selection of a lithium ion-conductive solid electrolyte is important for preparing an all-solid lithium secondary battery having excellent performance. It is described that the energy density of the all-solid lithium secondary battery can be enhanced when a sulfide which does not contain silicon and germanium is used as a solid electrolyte based on this consideration.

For example, Japanese Patent Laid-open Publication No. 2008-288098 (hereinafter, referred to as Patent Document 2) describes that a powder having an average particle size of 0.01 to 10 µm is used as a sulfide-based solid electrolyte having a high ion conductivity.

Patent Document 1: Japanese Patent Laid-open Publication No. 2003-68361

Patent Document 2: Japanese Patent Laid-open Publication No. 2008-288098

SUMMARY OF THE INVENTION

In a configuration of an all-solid battery, a local reaction takes place, resulting in deterioration of charge-discharge efficiency. The local reaction refers to a reaction in which an insertion/desorption reaction of lithium ions that normally proceeds over the whole of an electrode layer (active material layer) proceeds over only apart of the electrode layer.

When the local reaction takes place in the electrode layer, absorption of lithium ions is concentrated on an active material at a specific location, so that the utilization rate of the active material is reduced. Further, in a negative electrode containing carbon as an active material, when the charge rate is increased, local overcharge occurs, so that a lithium metal is precipitated. When the precipitated lithium metal grows along a direction perpendicular to the lamination direction and arrives at a positive electrode layer, the battery is short-circuited, leading to occurrence of voltage reduction.

In Patent Document 1, there may be a situation in which, depending on the type of the carbon material to be used as a negative electrode active material or the mixed state of a negative electrode active material and a solid electrolyte in a negative electrode layer, a sufficient conductive path is not formed, and therefore a local reaction takes place, so that output characteristics are deteriorated.

In Patent Document 2, the particle size of a powder that forms an active material is not taken into consideration, and an optimum particle size of a solid electrolyte powder to an active material powder and an optimum mixing ratio between a solid electrolyte powder and an active material powder are not obtained, and therefore when the charge rate is increased, a local reaction may take place, resulting in occurrence of local overcharge.

Accordingly, an object of the present invention is to provide an all-solid battery, the charge-discharge efficiency of which can be enhanced by suppressing a local reaction in an electrode layer.

The present inventors have extensively conducted studies on the configuration of an all-solid battery, and resultantly found that a local reaction takes place when a difference between the mobility of lithium ions and the mobility of electrons is extremely large. That is, the present inventors have found that a local reaction in the electrode layer can be suppressed by controlling the mobility of lithium ions inserted into an electrode layer from the solid electrolyte layer side, and the mobility of electrons entering the electrode layer from the current collector layer side. Based on this finding, the all-solid battery according to the present invention has the following features.

The all-solid battery according to the present invention includes a positive electrode layer, a negative electrode layer, and a solid electrolyte later interposed between the positive electrode layer and the negative electrode layer. At least one electrode layer of the positive electrode layer and the negative electrode layer contains an electrode active material and a solid electrolyte. In the electrode layer, a difference between a resistivity associated with ion migration and a resistivity associated with electron migration is 0 kΩ·cm or more and 100 kΩ·cm or less.

The resistivity associated with ion migration in the electrode layer is preferably 70 kΩ·cm or less.

The resistivity associated with electron migration in the electrode layer is preferably 100 kΩ·cm or less.

Further, the electrode layer is preferably the negative electrode layer.

In this case, it is preferred that the negative electrode layer contains carbon as the electrode active material.

According to the present invention, an all-solid battery having high charge-discharge efficiency can be obtained by ensuring that a difference between a resistivity associated with ion migration and a resistivity associated with electron migration falls within a predetermined range in an electrode layer.

DETAILED DESCRIPTION OF THE INVENTION

Hereinafter, embodiments of the present invention will be described with reference to the drawings.

Figure 1:
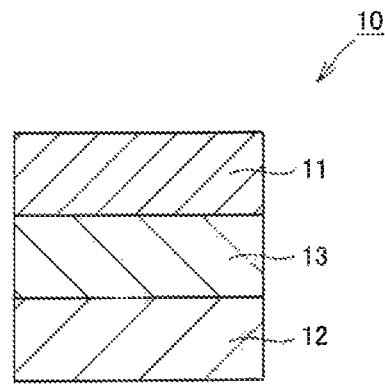
FIG. 1 is a sectional view schematically showing cross section structures of battery elements of an all-solid battery as an embodiment of the present invention.
Figure 2:
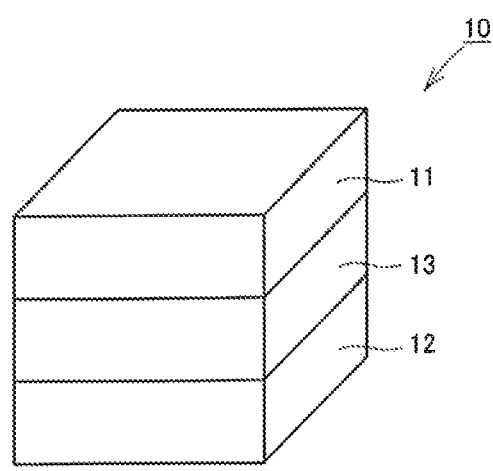
FIG. 2 is a perspective view schematically showing battery elements of an all-solid battery as one embodiment of the present invention.
Figure 3:
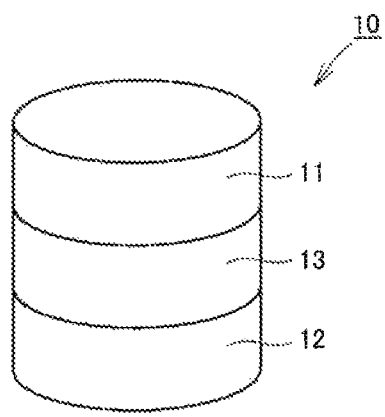
FIG. 3 is a perspective view schematically showing battery elements of an all-solid battery as another embodiment of the present invention.

As shown in FIG. 1, an all-solid battery 10 of the present invention includes a positive electrode layer 11, a negative electrode layer 12, and a solid electrolyte later 13 interposed between the positive electrode layer 11 and the negative electrode layer 12. As shown in FIG. 2, the all-solid battery 10 is formed in the shape of a rectangular parallelepiped, and includes a laminate composed of a plurality of flat layers each having a rectangular flat surface as one embodiment of the present invention. As shown in FIG. 3, the all-solid battery 10 is formed in a cylindrical shape, and includes a laminate composed of a plurality of disc-shaped layers as another embodiment of the present invention. Each of the positive electrode layer 11 and the negative electrode layer 12 contains a solid electrolyte and an electrode active material, and the solid electrolyte layer 13 contains a solid electrolyte.

In the all-solid battery 10 of the present invention which is configured as described above, a difference between a resistivity associated with ion migration and a resistivity associated with electron migration is 0 kΩ·cm or more and 100 kΩ·cm or less, preferably more than 0 kΩ·cm and 100 kΩ·cm or less in at least one of the electrode layers: the positive electrode layer 11 and the negative electrode layer 12.

When the difference between the resistivity associated with ion migration and the resistivity associated with the electron migration in the electrode layer falls within the above-described range, the mobility of lithium ions inserted into an electrode layer from the solid electrolyte layer side, and the mobility of electrons entering the electrode layer from the current collector layer side can be controlled. Consequently, a local reaction in the electrode layer can be suppressed. As a result, precipitation of a lithium metal at an interface between the solid electrolyte and the electrode active material can be suppressed even when charge-discharge is repeated at a high rate. Consequently, an all-solid battery having high charge-discharge efficiency can be obtained.

The above-described configuration and effect of the present invention are based on the findings by the present inventors described below.

Generally, an insertion/desorption reaction of lithium ions with an electrode active material proceeds at an interface between the solid electrolyte and the electrode active material. That is, electrons are supplied through an electron-conductive electrode active material and a conducting agent as an additive added as necessary, and lithium ions are supplied through the solid electrolyte to the interface between the solid electrolyte and the electrode active material. When supply of even one of the lithium ions and the electrons is disrupted, the insertion/desorption reaction of lithium ions does not take place. Therefore, battery characteristics are deteriorated.

In a nonaqueous electrolyte battery including an organic electrolytic solution, supply of lithium ions to the whole of the electrode is hard to be biased because the speed of migration of lithium ions is high, and the electrolytic solution permeates into the interface of the electrode active material, so that the electrolytic solution and the electrode active material are in contact with each other.

On the other hand, the electrode layer of the all-solid battery contains a solid electrolyte in addition to an electrode active material, and supply of lithium ions to the whole of the electrode layer may be biased because the speed of migration of lithium ions is low unlike the case of the nonaqueous electrolyte battery including an organic electrolytic solution. Further, the solid electrolyte is an insulator, and therefore supply of electrons into the electrode layer may also be biased depending on a dispersed state of the solid electrolyte in the electrode layer.

For this reason, it is difficult to uniformly supply lithium ions and electrons in the electrode layer of the all-solid battery. The insertion/desorption reaction of lithium ions does not proceed at a location where supply of one of lithium ions and electrons is disrupted. Conversely, lithium ions may be excessively inserted at a location where lithium ions are constantly supplied. Excessive insertion of lithium ions into the electrode active material causes an irreversible reaction, so that a compound which does not function as an active material is generated, leading to degradation of cycle characteristics. Further, it is also considered that excessive insertion of lithium ions induces precipitation of a lithium metal, and when the precipitated lithium metal grows along a direction perpendicular to the lamination direction and arrives at a positive electrode layer, the battery is short-circuited, leading to occurrence of voltage reduction.

Thus, the present inventors have found that it is important in the electrode design of the all-solid battery to balance the supply of lithium ions and electrons to suppress a local reaction in the electrode layer for improving battery characteristics. Based on this finding, in the all-solid battery 10 of the present invention, a difference between a resistivity associated with ion migration and a resistivity associated with electron migration is limited to 0 k$\Omega$·cm or more and 100 k$\Omega$·cm or less, preferably more than 0 k$\Omega$·cm and 100 k$\Omega$·cm or less in at least one of the electrode layers: the positive electrode layer 11 and the negative electrode layer 12.

In the negative electrode layer 12 containing carbon, which has high electron conductivity, as an electrode active material, the electron resistance is very low, and therefore it is necessary that the resistance associated with migration of lithium ions be kept as low as possible. The present inventors have found that by reducing the resistance associated with migration of lithium ions in the negative electrode layer 12 containing carbon, a local reaction can be suppressed to obtain the negative electrode layer 12 capable of being charged at a high speed. Therefore, in the all-solid battery 10 of the present invention, the target electrode layer for which a difference between the resistivity associated with migration of ions and the resistivity associated with migration of electrons falls within the above-mentioned range is preferably a negative electrode layer. Further, it is preferred that the negative electrode layer contains carbon as an electrode active material.

The resistivity associated with ion migration in the electrode layer is preferably 70 k$\Omega$·cm or less. The resistivity associated with electron migration in the electrode layer is preferably 100 k$\Omega$·cm or less.

The positive electrode layer 11 contains, for example, $Li_2FeS_2$ etc. as a positive electrode active material, and a mixture of $Li_2S$ and $P_2S_5$, etc., which is an ion-conductive compound, as a solid electrolyte. The negative electrode layer 12 contains, for example, a carbon material such as spherical graphite as a negative electrode active material, and a mixture of $Li_2S$ and $P_2S_5$, etc., which is an ion-conductive compound, as a solid electrolyte. The solid electrolyte layer 13 sandwiched between the positive electrode layer 11 and the negative electrode layer 12 contains, for example, a mixture of $Li_2S$ and $P_2S_5$, etc., which is an ion-conductive compound, as a solid electrolyte. The positive electrode layer 11, the negative electrode layer 12 and the solid electrolyte layer 13 are each prepared by compression-molding a raw material powder. The solid electrolyte should contain at least lithium and sulfur as constituent elements, and examples of such a compound may include a mixture of $Li_2S$ and $B_2S_3$ in addition to a mixture of $Li_2S$ and $P_2S_5$. The solid electrolyte should preferably further contain phosphorus in addition to lithium and sulfur as constituent elements, and examples of such a compound may include $Li_7P_3S_{11}$, $Li_3PS_4$ and compounds with their anions partially substituted with oxygen, in addition to a mixture of $Li_2S$ and $P_2S_5$. The composition ratio of elements that form the solid electrolyte is not limited to the above-described ratios. The positive electrode active material should contain lithium, iron and sulfur as constituent elements, and examples of such a compound may include compounds such as $Li_{2.33}Fe_{0.67}S_2$ in addition to $Li_2FeS_2$. Further, examples of other positive electrode active materials may include compounds such as lithium titanium sulfide and lithium vanadium sulfide. The composition ratio of elements that form the positive electrode active material is not limited to the above-described ratios.

For ensuring that a difference between a resistivity associated with ion migration and a resistivity associated with electron migration in the electrode layer of the all-solid battery 10 of the present invention falls within the above-mentioned range, the following strategies can be taken to reduce the resistance associated with migration of lithium ions.

(1) A solid electrolyte having a high ion conductivity is used.

Besides a mixture of $Li_2S$ and $P_2S_5$, an oxide etc. may be used as a solid electrolyte.

(2) The mixing ratio between an electrode active material and a solid electrolyte is adjusted.

By increasing the ratio of a solid electrolyte in an electrode mixture, a thicker ion-conductive path is formed. However, a mixing ratio that causes an electron-conductive path to be completely lost by a solid electrolyte is not desirable.

(3) The method for mixing an electrode mixture is adjusted.

The method for mixing an electrode mixture also takes part in formation of an ion-conductive path and an electron-conductive path similarly to (2). For forming an ion-conductive path with a small amount of a solid electrolyte, it is necessary to employ a mixing method that enhances dispersibility of the solid electrolyte. The optimum mixing method varies depending on the type of the solid electrolyte. It is necessary to select a mixing method appropriate to the shape and hardness of the solid electrolyte.

When the target electrode layer is a negative electrode layer, the material to be used for the negative electrode active material does not affect the resistance associated with ion migration in the negative electrode mixture. Therefore, as the negative electrode active material, many kinds of materials, for example, carbon materials such as graphite and hard carbon, alloy-based materials, sulfur and metal sulfides can be used.

The all-solid battery 10 of the present invention may be used while the battery elements shown in FIGS. 1 to 3 are inserted in, for example, a container made of ceramic, or used independently as in the form shown in FIGS. 1 to 3.

Next, examples of the present invention will be described in detail. Examples shown below are illustrative, and the present invention is not limited to the examples described below.

EXAMPLES

Hereinafter, Examples 1 to 3 and Comparative Examples 1 and 2 will be described in each of which an all-solid battery was prepared with the varied difference between a resistivity associated with ion migration and a resistivity associated with electron resistivity in a negative electrode layer.

Example 1

<Preparation of Solid Electrolyte>

Powders of $Li_2S$ and $P_2S_5$ as sulfides were subjected to a mechanical milling treatment to prepare a solid electrolyte.

Specifically, the $Li_2S$ powder and the $P_2S_5$ powder were weighed in an argon gas atmosphere so as to have a molar ratio of 70:30, and added in a container made of alumina. An alumina ball having a diameter of 10 mm was added in the container, and the container was tightly closed. The container was set in a mechanical milling apparatus (a planetary ball mill manufactured by Fritsch; Model P-7), and a mechanical milling treatment was performed at a rotation number of 370 rpm for 20 hours. Thereafter, the container was opened in an argon gas atmosphere, 2 mL of toluene was added in the container, and the container was tightly closed. Further, a mechanical milling treatment was performed at a rotation number of 200 rpm for 2 hours. The slurry-like material thus obtained was filtered in an argon gas atmosphere, and then vacuum-dried. The obtained powder was heated in a vacuum atmosphere at a temperature of 200° C. to 300° C. to obtain a glass ceramic powder. The glass ceramic powder was used as a solid electrolyte.

<Preparation of Negative Electrode Mixture>

Spherical graphite (manufactured by Nippon Power Graphite Co., Ltd.; product name: GDS-15-1) was used as a negative electrode active material. The negative electrode active material was used after being heated at a temperature of 800° C. in an argon gas atmosphere for 2 hours to remove impurities on the surface.

The solid electrolyte obtained as described above and the negative electrode active material were mixed at a weight ratio of 60:40 using a rocking mill, thereby preparing a negative electrode mixture.

<Measurement of Ion Resistivity of Negative Electrode Mixture>

The solid electrolyte and the negative electrode mixture were added in the order of the solid electrolyte, the negative electrode mixture and the solid electrolyte in a mold having a diameter of 7.5 mm, and pressed at a pressure of 329 MPa. Thereafter, a lithium foil and a stainless steel foil each having a diameter of 5 mm were superimposed on the surface of the solid electrolyte, and pressed at a pressure of 36 MPa, and the stainless steel foil, the lithium foil, the solid electrolyte, the negative electrode mixture, the solid electrolyte, the lithium foil and the stainless steel foil were laminated in this order to prepare a molded article. The molded article was caught by a stainless steel electrode plate to prepare an ion resistance measuring cell A.

For the obtained cell A, an a.c. impedance was measured to determine a migration resistance of lithium ions. In the measurement of the a.c. impedance, a voltage of 10 mV was applied to an open circuit potential (0 V) in a frequency range of 1 MHz-10 Hz-1 Hz. A total resistance was determined from an end point of a semicircle in the Cole-Cole plot obtained. As a result, the a.c. resistance value of the cell A was 2.02 kΩ.

Apart from the cell A, an ion resistance measuring cell B having a configuration in which the stainless steel foil, the lithium foil, the solid electrolyte, the lithium foil and the stainless steel foil were laminated in this order was prepared. The a.c. resistance value of the cell B determined in the same manner as described above was 700Ω. This resistance value corresponds to the resistance value of the solid electrolyte part alone in the cell A.

A value of 1.32 kΩ obtained by subtracting the resistance value of the cell B (700Ω) from the resistance value of the cell A (2.02Ω) was defined as an ion resistance value of the negative electrode mixture part.

An ion resistivity was calculated from the obtained ion resistance value of the negative electrode mixture part (1.32 kΩ), the area of the negative electrode mixture layer (0.441 $cm^2$) and the thickness (0.05 cm). The ion resistivity of the negative electrode mixture part, i.e. the resistivity associated with ion migration in the negative electrode layer was 12 kΩ·cm.

<Measurement of Electron Resistivity of Negative Electrode Mixture>

The negative electrode mixture was added in a mold having a diameter of 10 mm, and pressed at a pressure of 329 MPa to prepare a molded article. Gold (Au) was deposited on both surfaces of the obtained molded article by sputtering. A molded article having a configuration in which gold, the negative electrode mixture and gold were laminated in this order was caught by a stainless steel electrode plate to prepare an electron resistance measuring cell.

A constant current of 100 μA was made to pass through the obtained cell, and an electron resistance value was calculated at the time when the voltage was stabilized. An electron resistivity was calculated from the obtained electron resistance value of the negative electrode mixture part (1.9Ω), the area of the negative electrode mixture layer (0.785 $cm^2$) and the thickness (0.05 cm). The electron resistivity of the negative electrode mixture part, i.e. the resistivity associated with electron migration in the negative electrode layer was 30 Ω·cm.

<Difference between Electron Resistivity and Ion Resistivity of Negative Electrode Mixture>

A difference obtained by subtracting the electron resistivity from the ion resistivity of the negative electrode mixture was (12 kΩ·cm−0.030 kΩ·cm≈) 12 kΩ·cm.

<Preparation of Positive Electrode Mixture>

$Li_2FeS_2$ (manufactured by NIPPON CHEMICAL INDUSTRIAL CO., LTD.) was used as a positive electrode active material. The solid electrolyte obtained as described above and the positive electrode active material were mixed at a weight ratio of 50:50 to prepare a positive electrode mixture.

<Preparation of Battery>

The positive electrode mixture, the solid electrolyte and the negative electrode mixture obtained as described above were added in this order in a mold, and press-molded to prepare a laminate. The obtained laminate was in the shape of a rectangular parallelepiped having a width of 2.6 mm, a length of 2.6 mm and a height of 0.5 mm, and the thickness of each layer was 0.2 mm for the negative electrode layer, 0.2 mm for the solid electrolyte layer and 0.1 mm for the positive electrode layer. The laminate was enclosed in a ceramic package with electrodes drawn to outside, thereby preparing an all-solid battery.

<Evaluation of Battery Characteristics>

The all-solid battery was charged at current densities of 0.7 $mA/cm^2$, 1.5 $mA/cm^2$ and 3.0 $mA/cm^2$, so that the degradation of battery characteristics was evaluated. The degradation of battery performance was determined in the following manner.

The battery was charged at current densities of 0.7 $mA/cm^2$, 1.5 $mA/cm^2$ and 3.0 $mA/cm^2$, and then discharged at a current density of 0.3 $mA/cm^2$. A ratio of the discharge capacity to the charge capacity (charge-discharge efficiency) was determined from the following equation.

Charge-discharge efficiency (%)=(discharge capacity/charge capacity)×100

The charge-discharge efficiency is close to 100% when there is no excessive charge capacity due to short-circuiting during charge, and the charge-discharge efficiency decreases as influences of short-circuiting become greater. That is, the degradation of battery performance becomes smaller as the charge-discharge efficiency is closer to 100%.

As a result, charge-discharge efficiencies at current densities of 0.7 $mA/cm^2$, 1.5 $mA/cm^2$ and 3.0 $mA/cm^2$ were 92.9%, 90.1% and 79.6%, respectively. It is apparent that the battery can be charged even at a high current density of 3.0 $mA/cm^2$, and can be charged at a high rate.

Example 2

In the same manner as in Example 1 except that the mixing ratio between a solid electrolyte and a negative electrode active material was 50:50 in preparation of a negative electrode mixture, an electron resistivity and an ion resistivity of the negative electrode mixture were measured, a difference therebetween was determined, an all-solid battery was prepared, and battery characteristics were evaluated.

The negative electrode mixture had an ion resistivity of 53 kΩ·cm and an electron resistivity of 0.025 kΩ·cm, and a difference obtained by subtracting the electron resistivity from the ion resistivity of the negative electrode mixture was (53 kΩ·cm−0.025 kΩ·cm≈) 53 kΩ·cm.

Charge-discharge efficiencies at current densities of 0.7 mA/cm², 1.5 mA/cm² and 3.0 mA/cm² were 89%, 65% and 42%, respectively. At a high current density of 3.0 mA/cm², the charge-discharge efficiency was significantly deteriorated, indicating influences of short-circuiting. However, it is apparent that the battery can be charged at a current density of 1.5 mA/cm², and can be charged at a high rate.

Example 3

In the same manner as in Example 2 except that the molar ratio of a $Li_2S$ powder to a $P_2S_5$ powder was 80:20 in preparation of a solid electrolyte, and the solid electrolyte and a negative electrode active material were mixed by a ball mill using round stone having a diameter of 1 mm in preparation of a negative electrode mixture, an electron resistivity and an ion resistivity of the negative electrode mixture were measured, a difference therebetween was determined, an all-solid battery was prepared, and battery characteristics were evaluated.

The negative electrode mixture had an ion resistivity of 63 kΩ·cm and an electron resistivity of 0.015 kΩ·cm, and a difference obtained by subtracting the electron resistivity from the ion resistivity of the negative electrode mixture was (63 kΩ·cm−0.015 kΩ·cm≈) 63 kΩ·cm.

Charge-discharge efficiencies at current densities of 0.7 mA/cm² and 1.5 mA/cm² were 91.1% and 69.6%, respectively. It is apparent that the battery can be charged at a current density of 1.5 mA/cm², and can be charged at a high rate.

Comparative Example 1

In the same manner as in Example 1 except that the mixing ratio between a solid electrolyte and a negative electrode active material was 40:60 in preparation of a negative electrode mixture, an electron resistivity and an ion resistivity of the negative electrode mixture were measured, a difference therebetween was determined, an all-solid battery was prepared, and battery characteristics were evaluated.

The negative electrode mixture had an ion resistivity of 120 kΩ·cm and an electron resistivity of 0.019 kΩ·cm, and a difference obtained by subtracting the electron resistivity from the ion resistivity of the negative electrode mixture was (120 kΩ·cm−0.019 kΩ·cm≈) 120 kΩ·cm.

Charge-discharge efficiencies at current densities of 0.7 mA/cm², 1.5 mA/cm² and 3.0 mA/cm² were 83%, 55% and 31%, respectively. At a high current density of 3.0 mA/cm², the charge-discharge efficiency was significantly deteriorated, indicating influences of short-circuiting, and a significant degradation of characteristics was observed even during charge at a current density of 1.5 mA/cm². It is thus apparent that the battery is poor in output characteristics.

Comparative Example 2

In the same manner as in Example 3 except that a solid electrolyte and a negative electrode active material were mixed by a rocking mill in preparation of a negative electrode mixture, an electron resistivity and an ion resistivity of the negative electrode mixture were measured, a difference therebetween was determined, an all-solid battery was prepared, and battery characteristics were evaluated.

The negative electrode mixture had an ion resistivity of 300 kΩ·cm and an electron resistivity of 0.014 kΩ·cm, and a difference obtained by subtracting the electron resistivity from the ion resistivity of the negative electrode mixture was (300 kΩ·cm−0.014 kΩ·cm≈) 300 kΩ·cm.

Charge-discharge efficiencies at current densities of 0.7 mA/cm² and 1.5 mA/cm² were 57.4% and 45.8%, respectively. At a high current density of 1.5 mA/cm², the charge-discharge efficiency was significantly deteriorated, indicating influences of short-circuiting, and a significant degradation of characteristics was observed even at a current density of 0.7 mA/cm². It is thus apparent that the battery is poor in output characteristics.

The above results are shown in Table 1. In "Evaluation of high-speed charge characteristics" in Table 1, "Good" is assigned in the case where the battery was charged and showed a high value as charge-discharge efficiency even at a high current density of 1.5 mA/cm² or more, and "Poor" is assigned otherwise.

TABLE 1

| | Ion resistivity [kΩ · cm] | Electron resistivity [kΩ · cm] | Difference in resistivity [kΩ · cm] | Evaluation of high-speed charge characteristics |
|---|---|---|---|---|
| Example 1 | 12 | 0.030 | 12 | Good |
| Example 2 | 53 | 0.025 | 53 | Good |
| Example 3 | 63 | 0.015 | 63 | Good |
| Comparative Example 1 | 120 | 0.019 | 120 | Poor |
| Comparative Example 2 | 300 | 0.014 | 300 | Poor |

It should be considered that embodiments and examples disclosed herein are illustrative and not restrictive in all respects. The scope of the present invention is defined not by embodiments and examples described above, but by claims, and is intended to include all changes and modifications in the meaning and scope equivalent to claims.

According to the present invention, an all-solid battery having high charge-discharge efficiency can be obtained.

DESCRIPTION OF REFERENCE SYMBOLS

10: all-solid battery
11: positive electrode layer
12: negative electrode layer
13: solid electrolyte layer

The invention claimed is:
1. An all-solid battery comprising:
a positive electrode layer;
a negative electrode layer; and
a solid electrolyte layer interposed between the positive electrode layer and the negative electrode layer, wherein at least one of the positive electrode layer and the negative electrode layer contains an electrode active material and a solid electrolyte, and a difference between a resistivity associated with ion migration and a resistivity associated with electron migration is 0 kΩ·cm or more and 12 kΩ·cm or less in the at least one of the positive electrode layer and the negative electrode layer containing the electrode active material and the solid electrolyte, wherein neither the resistivity associated with ion migration nor the resistivity associated with electron migration is zero.

2. The all-solid battery according to claim 1, wherein the negative electrode layer contains the electrode active material and the solid electrolyte.

3. The all-solid battery according to claim 2, wherein the electrode active material is carbon.

4. The all-solid battery according to claim 1, wherein the positive electrode layer contains the electrode active material and the solid electrolyte.

5. The all-solid battery according to claim 4, wherein the electrode active material is $Li_2FeS_2$.

6. The all-solid battery according to claim 1, wherein both the negative electrode layer and the positive electrode layer contain the electrode active material and the solid electrolyte.

7. The all-solid battery according to claim 6, wherein the electrode active material in the negative electrode layer is carbon, and the electrode active material in the positive electrode layer is $Li_2FeS_2$.

8. The all-solid battery according to claim 1, wherein the solid electrolyte contains lithium and sulfur.

9. The all-solid battery according to claim 8, wherein the solid electrolyte further contains phosphorous.

* * * * *